UNITED STATES PATENT OFFICE.

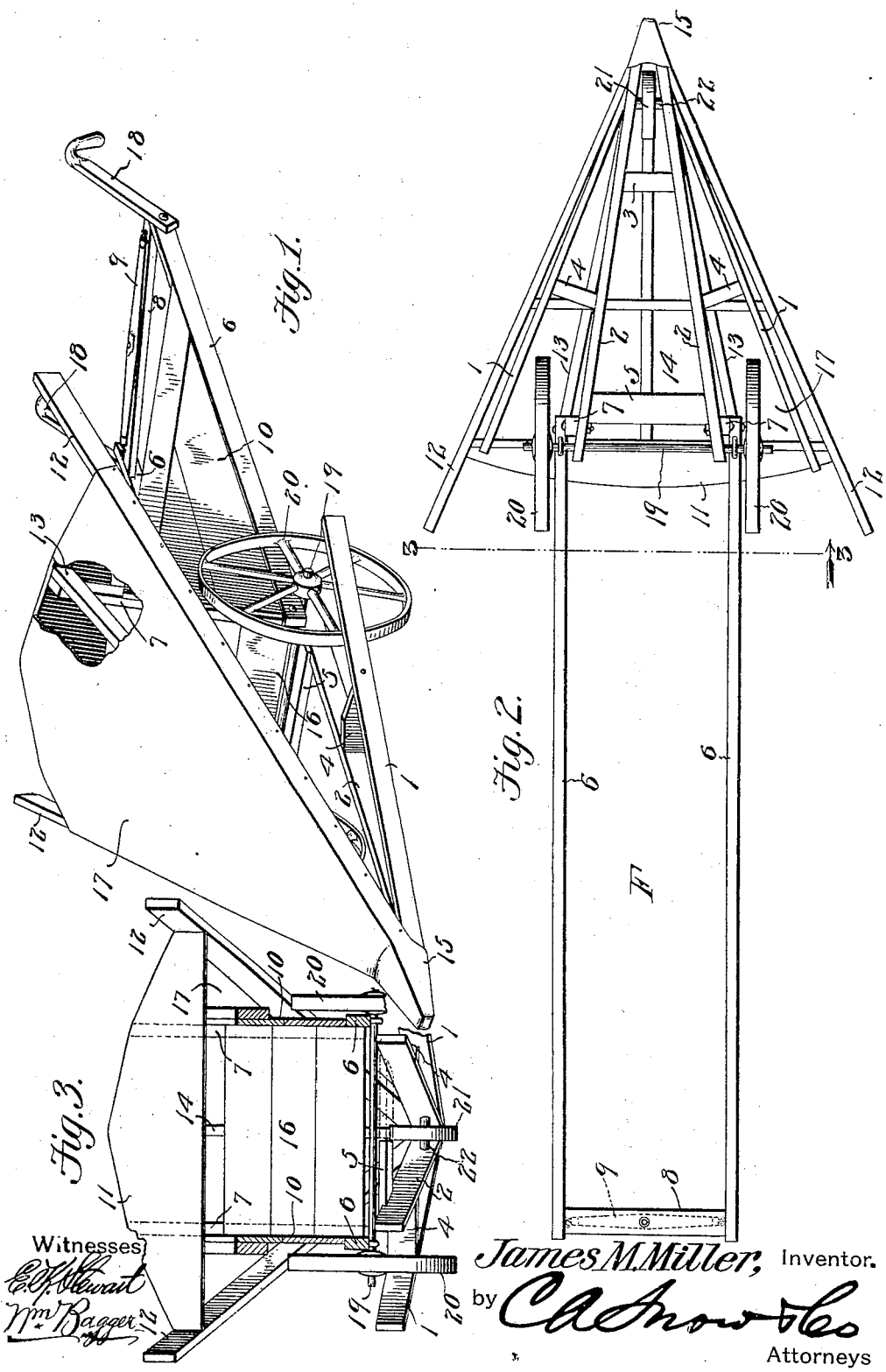

JAMES M. MILLER, OF RUSHVILLE, INDIANA.

CORN-LIFTING DEVICE.

No. 813,509. Specification of Letters Patent. Patented Feb. 27, 1906.

Application filed October 4, 1905. Serial No. 281,340.

*To all whom it may concern:*

Be it known that I, JAMES M. MILLER, a citizen of the United States, residing at Rushville, in the county of Rush and State of Indiana, have invented a new and useful Corn-Lifting Device, of which the following is a specification.

This invention relates to corn-lifting devices for the purpose of lifting or raising down corn and restoring it to a standing position.

It frequently happens that corn, owing to wind-storms and other natural causes, becomes beaten down, so as to lie flat across the rows, or partially so. The down corn interferes materially with subsequent field operations, and it is especially objectionable when, as is the case in many sections of the country, it is desired to plant wheat or other seeds between the corn-rows, since the down corn will interfere with the progress of the planter and will either be trodden down or require to be raised or lifted manually in front of the seeder.

By this invention there is provided a device of simple and effective construction whereby the down corn may be mechanically lifted and restored to a standing position prior to the passage of the seed-planter, the objects of the present invention being to provide a device of the class referred to which shall possess superior advantages in point of simplicity, durability, and general efficiency.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the invention may be resorted to when desired.

In the drawings, Figure 1 is a perspective view of the improved corn-lifting device. Fig. 2 is a bottom plan view of the same. Fig. 3 is a transverse sectional view taken on the plane indicated by the line 3 3 in Fig. 2.

Corresponding parts in the several figures are indicated throughout by similar characters of reference.

The base-frame of the improved device is wedge-shaped, and it includes a plurality of bars, as 1 1 and 2 2, converging forwardly and spaced apart at intervals, as by braces 3 and 4 4. An additional cross-brace 5 connects the bars 2 2 near their rear ends.

F is a draft-frame composed of side members 6 6, the front ends of which are connected with uprights 7, which are securely connected with the bars 2 of the base-frame. The frame members 6 6 are connected near their rear ends by a cross-bar 8, upon which is pivoted a whiffletree 9 for the attachment of the draft. Upon the upper sides of the side members of the draft-frame are supported the side pieces 10, which are wedge-shaped, as shown, the front ends of said side pieces being connected with the uprights 7. Supported upon said side pieces and secured to the upper ends of the uprights 7 is a transverse arched board 11, the ends of which are connected with frame members 12, which are extended and converged forwardly, as shown. Similar converging bars or frame members are secured at the upper ends of the uprights 7 and centrally at the upper edge of the board 11, said frame-bars being designated 13 13 and 14. The bars 1, 2, 12, 13, and 14 all converge at a common point and are connected to form the nose or snout of the machine, as indicated at 15.

The uprights 7 may be connected by a transverse wall formed of planking, as shown at 16, for the purpose of adding to the strength of the structure. The frame formed by the bars 12, 13, and 14 is covered by a hood 17, of sheet metal or other suitable material. Handles 18, whereby the machine may be steered, are provided at the rear ends of the side members of the draft-frame.

Upon the under sides of the side members of the draft-frame near the front end of the latter are bearings for an axle 19, carrying transporting-wheels 20. A smaller wheel 21 is mounted upon an axle 22, which is journaled between the members 2 2 of the base-frame directly in rear of the snout of the machine.

The operation of this invention and its advantages will be readily understood from the foregoing description, taken in connection with the drawings hereto annexed. The draft-animal is hitched to the whiffletree 9, so as to walk between the side members of the draft-frame, thus pushing the corn-lifting device, which consists of the hood-covered frame, which is of such a shape as to engage under the down corn and to gradually lift the fallen stalks to a standing position. It is obvious that the implement is made of such a width that it may travel conveniently between the rows of corn, the outer side bars 12, supporting the hood, being spaced wider apart than any other portion of the machine, so that the stalks that are being lifted will receive an inward tilt, which is effective in causing them to remain in a standing position until the passage of the seed-planter or other agricultural implement which is to follow. The operator, who walks behind the machine, is enabled by the handles 18 to guide the machine in the most effective way to accomplish the purposes of the invention.

This device, as will be seen from the foregoing description, is extremely simple in its construction and may be manufactured and operated at a very trifling expense. Its uses are not limited to the purpose of raising or lifting down corn in advance of the seed-planter; but it may be found extremely useful for the purpose of restoring down corn to a standing position after destructive storms, thus saving much corn which would otherwise be a total loss. It may also be utilized for the purpose of lifting down corn in advance of corn-harvesting machines, although machines of the latter type, as is well known, are usually equipped with means of some kind for the purpose stated.

Having thus described the invention, what is claimed is—

1. A device for lifting down corn consisting of a frame including a plurality of bars meeting at a common point, a hood covering the upper portion of said frame, and a wheel-supported push-frame connected therewith.

2. A device for lifting down corn including a base-plate composed of forwardly-converging members meeting at a common point, a top frame composed of forwardly-converging members extended to the meeting-point of the members of the base-frame, and a hood covering the members of the top frame.

3. A device for lifting down corn including a wedge-shaped base-frame and an inclined wedge-shaped top frame the side members of which meet at the forward extremity of the base-frame; the rear ends of the side members of the top frame being spaced apart wider than the rear extremity of the base-frame.

4. A corn-lifting device comprising a push-frame including wheel-supported side members, and a forwardly-tapering and downwardly-inclined hood-covered lifting-frame.

5. A corn-lifting device including a hood-covered lifting-frame, and a wheel-supported push-frame connected therewith.

6. A corn-lifting device including a lifting-frame, a push-frame connected therewith, handles connected with the push-frame, and supporting-wheels.

7. A corn-lifting device including a lifting-frame, a wheel-supported push-frame connected therewith and having side members, a cross-bar connecting the side members of the push-frame, draft means connected with the cross-bar, and handles connected with the side members of the push-frame.

8. A corn-lifting device including a forwardly-pointed lifting-frame, a supporting-wheel under the forward extremity of said frame, a wheel-supported push-frame connected with the lifting-frame, and handles connected with the push-frame for manipulating the device.

In testimony that I claim the foregoing as my own I have hereto affixed my signature in the presence of two witnesses.

JAMES M. MILLER.

Witnesses:
  OLIVER J. COOK,
  ELOISE M. OSBORN.